(No Model.) F. WINSLOW. 2 Sheets—Sheet 1.

ANIMAL TRAP.

No. 252,852. Patented Jan. 24, 1882.

Witnesses:
J. W. Garner
H. S. D. Haines

Inventor:
Frank Winslow
By Soulé & Co
Attorneys (No Model.) 2 Sheets—Sheet 2.
F. WINSLOW.
ANIMAL TRAP.
No. 252,852. Patented Jan. 24, 1882.
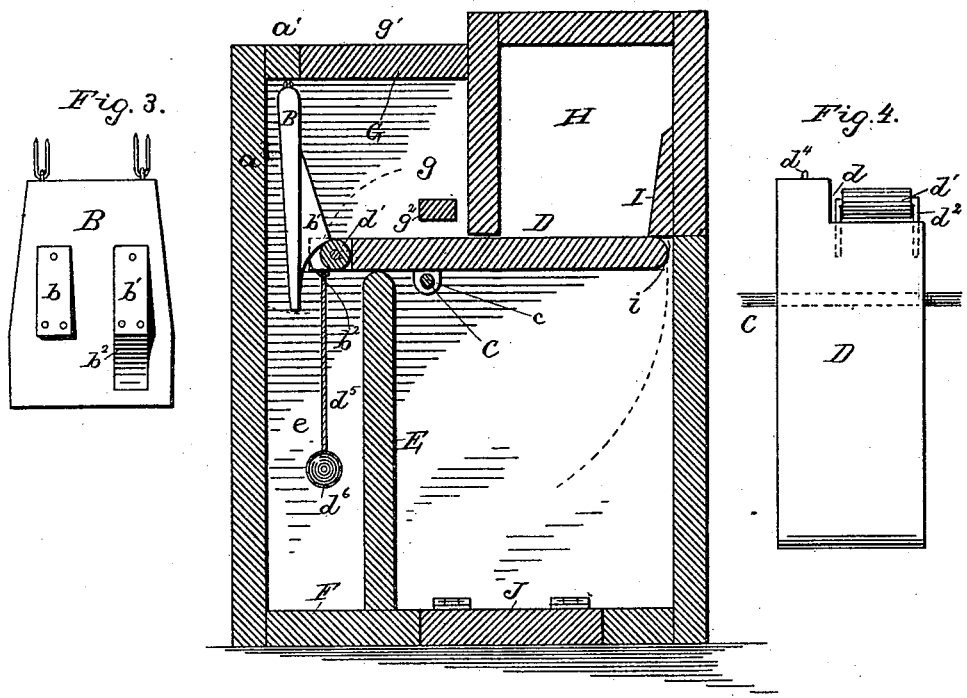
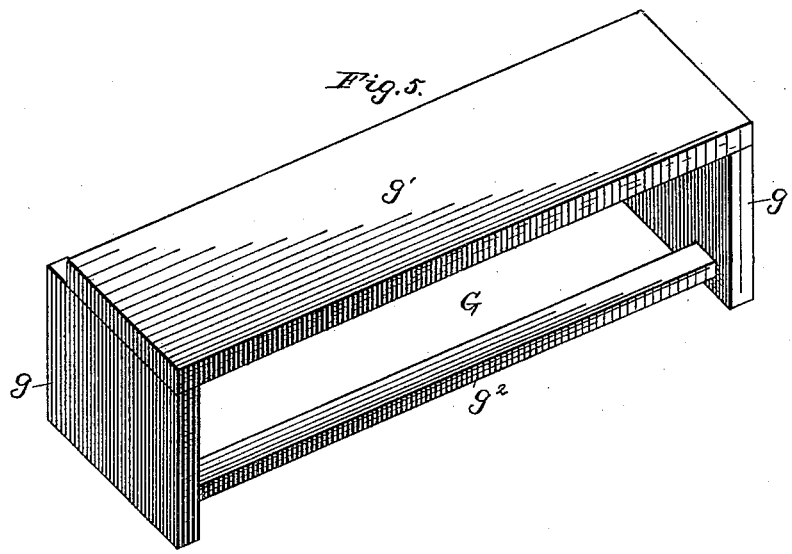
Witnesses:
J. B. Garner
W. S. D. Haines
Inventor:
Frank Winslow
By Soulé & Co.
Attorneys

UNITED STATES PATENT OFFICE.

FRANK WINSLOW, OF HIAWATHA, KANSAS.

ANIMAL-TRAP.

SPECIFICATION forming part of Letters Patent No. 252,852, dated January 24, 1882.

Application filed November 12, 1881. (No model.)

*To all whom it may concern:*

Be it known that I, FRANK WINSLOW, a citizen of the United States, residing at Hiawatha, in the county of Brown and State of Kansas, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to rat-traps, the object being to provide a trap of simple and economical construction, which will be effective in operation and durable in use.

The invention consists in the improved construction hereinafter set forth and claimed.

Figure 1:
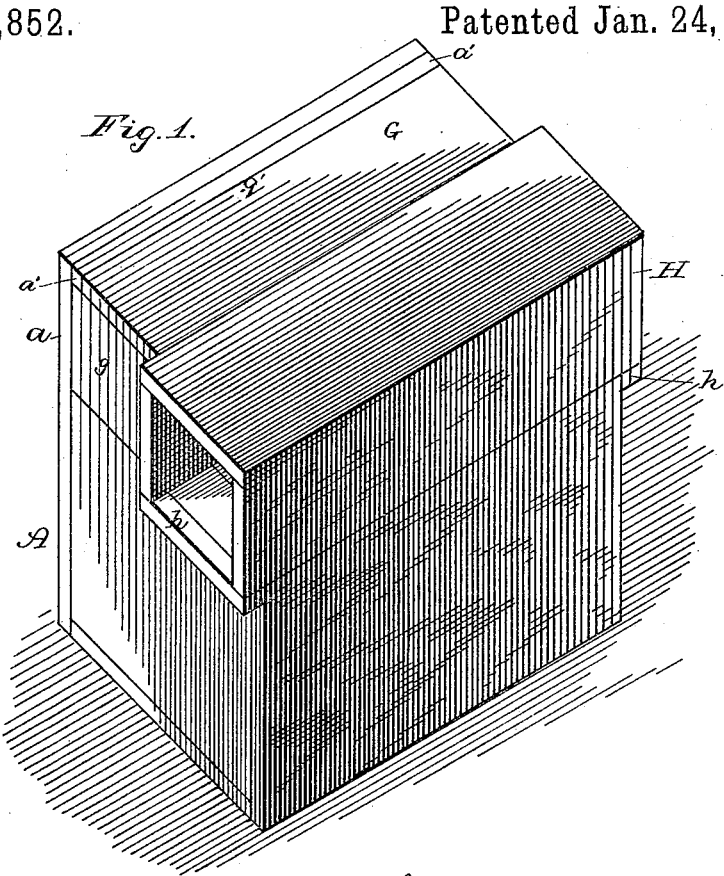
Figure 2:
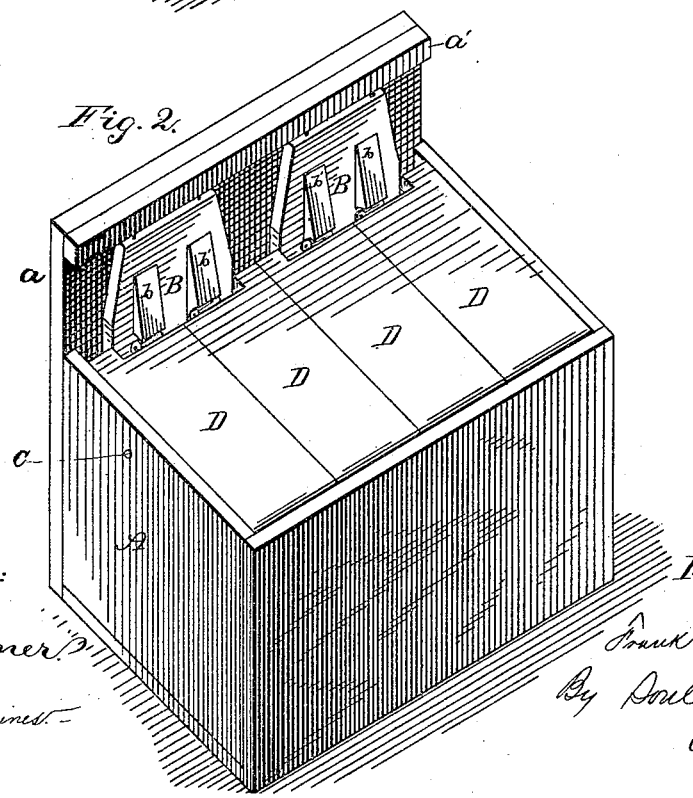

In the accompanying drawings, Figure 1 is a perspective view of the trap complete. Fig. 2 is a similar view with the top portions removed. Figs. 3, 4, and 5 show parts in detail. Fig. 6 is a transverse section of the trap.

A represents a box, preferably rectangular in form, which forms the main portion or cage of the trap. The rear side, $a$, of the box projects considerably above the other side and ends of the box, and to the upper inner side of the end $a$ is secured a transverse strip or cleat, $a'$. To the under side of the latter are hinged, by hooks or staples or other means, any desired number of swinging leaves, B. Each of these leaves is provided with two catches or stops, $b\ b'$, secured near the sides, and at about the center of the height of the same. The catches $b'$ are each cut away or beveled, as shown at $b^2$, for a purpose hereinafter described.

C represents a shaft passing across the box slightly below the upper edge and supported by the end walls of the box. Upon this shaft are pivotally secured by staples $c$ a series of tilting platforms, D. The rear end of each platform is recessed, as at $d$, and within the recessed portion is supported a small roller, $d'$, by a staple, $d^2$, which forms the axis of the roller and has its ends drawn into the platform. The unrecessed part $d^3$ of the end of the platform is provided with a small staple, $d^4$, to which is secured a cord, $d^5$, by which to suspend a weight, $d^6$.

E represents a partition extending entirely across the box, and resting upon the bottom F of the latter, near the rear side, $a$. It then extends upward, either parallel with the sides or at an incline to the top of the box, to form a space, $e$, within which the weights $d^6$ are suspended.

It will be observed that the recessed portion $d$ of any one of the platforms coincides with that of the next adjacent platform; also, that the swinging leaves B are arranged equidistant between two of the tilting platforms, so that the roller of the outer platform will bear against the stop $b$ of the leaf, while the roller of the adjacent platform will be opposite and adapted to roll against the beveled stop $b'$.

I have shown in the drawings only four platforms, or two pairs, and two swinging leaves corresponding thereto; but it will be evident that more than two pairs of platforms and a correspondingly increased number of leaves may be used, if desired.

The leaves and platforms, as described, are so arranged that the rollers of the two outer platforms, or those nearest to the ends of the box, will, when pressure is applied to the forward ends of the platforms, be forced against the stops $b$, and thus held in horizontal position. The rollers of the two inner platforms are arranged relative to the beveled stops $b'$, so that when weight is applied to the forward ends of the platforms the latter will be tilted vertically and at once retracted by their weights. All of the platforms are normally held in horizontal position by means of the weights $d^6$.

G represents a removable portion of the top of the box A, constructed with sides $g$, fitting under the cleat $a'$, and a top, $g'$, coinciding with said cleat. A brace, $g^2$, extends transversely from one side to the other of the cover G, and serves to firmly brace the latter, and also as a stop for the recessed ends of the tilting platforms, to prevent the latter from tilting too far.

H represents a trough-shaped cover-section, which completes the device. It consists of a three-sided box or trough with open ends projecting slightly beyond either end of the box A. It is placed with its open side down upon the outer ends of the tilting platforms, and is secured to the box A by means of short cleats $h$, one on each end of the box H. To the inner side of the front section of the box H is secured a strip, I, (preferably beveled, as shown,) which covers the space $i$ between the ends of the platforms and the front side of the box A. The trough or box H is designed as a passage into which the rat will walk. The bait being placed on one of the inner platforms, a rat will enter one end of the passage H and walk on the unsupported ends of the platforms D. As above described, the platform nearest each end of the trap is so arranged that it will not tilt; but the rat may walk upon it to reach the bait upon the inner platform, when the weight of the rat will suddenly tilt the latter and drop the rat into the box A.

J represents a door in the bottom of the box A. This door may be of any desired construction, and, if preferred, may be located in one side of the box.

Many other changes in the details of construction may be made without departing from the spirit of my invention, and the trap may be constructed wholly or only partly of metal or any other material.

I claim—

1. In an animal-trap, the combination, with a box, of a transverse shaft supporting a series of weighted platforms, and suitable stop devices for engaging said platforms, substantially as described.

2. In an animal-trap, the combination, with a box, of a transverse shaft supporting a series of tilting platforms, and swinging leaves provided with catches or stops adapted to engage with said platforms, substantially as described.

3. In an animal-trap, the combination, with the box, having its rear side projecting above the other side and ends of the box, and provided with a transverse cleat, leaves hinged to said cleat, and each having two stops, one of which is beveled, of a series of tilting platforms pivoted upon a transverse shaft, and recessed and provided with rollers and weights, substantially as described.

4. In an animal-trap, the combination, with the box having the partition and transverse shaft, of a series of tilting platforms pivoted on said shaft and provided with weights, substantially as described.

5. In an animal-trap, the combination, with the box, transverse shaft, and swinging leaf having the catches, as described, of a pair of tilting platforms, recessed as described, and provided with rollers and supported upon said shaft, as set forth.

6. In an animal-trap, the combination, with the box and tilting platforms, of the removable trough or passage H, having its lower side open and secured to the box by end cleats, $h$, as set forth.

7. In an animal trap, the combination, with the box, of the removable top section, G, and removable passage H, having the end cleats, $h$ and interior transverse strip, I, substantially as described.

In testimony whereof I affix my signature in presence of two witnesses.

FRANK WINSLOW.

Witnesses:
A. F. DAVIS,
GREGORY AMANN.